US012612762B2

(12) United States Patent
Lim

(10) Patent No.: US 12,612,762 B2
(45) Date of Patent: Apr. 28, 2026

(54) DOZER

(71) Applicant: HD HYUNDAI INFRACORE CO., LTD., Incheon (KR)

(72) Inventor: Kyehyun Lim, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 266 days.

(21) Appl. No.: 18/243,367

(22) Filed: Sep. 7, 2023

(65) Prior Publication Data

US 2024/0084550 A1 Mar. 14, 2024

(30) Foreign Application Priority Data

Sep. 8, 2022 (KR) ........................ 10-2022-0114002

(51) Int. Cl.
*E02F 9/08* (2006.01)
*B60K 11/02* (2006.01)
*E02F 9/16* (2006.01)

(52) U.S. Cl.
CPC ............ *E02F 9/0866* (2013.01); *B60K 11/02* (2013.01); *E02F 9/0808* (2013.01); *E02F 9/0883* (2013.01); *E02F 9/16* (2013.01)

(58) Field of Classification Search
CPC ..... E02F 9/0866; E02F 9/0808; E02F 9/0883; E02F 9/16; B60K 11/02
See application file for complete search history.

(56) References Cited

U.S. PATENT DOCUMENTS

| | | |
|---|---|---|
| 2011/0173962 A1 | 7/2011 | Miwa et al. |
| 2013/0277135 A1 | 10/2013 | Sakai et al. |
| 2014/0311132 A1 | 10/2014 | Arai |
| 2016/0115671 A1 | 4/2016 | Sakai |
| 2017/0321392 A1* | 11/2017 | Oshikawa ............. E02F 9/0866 |
| 2018/0029464 A1 | 2/2018 | Uemura et al. |

OTHER PUBLICATIONS

Extended European Search Report dated Jan. 29, 2024 in connection with the counterpart European Patent Application No. EP23196021. 2, 10 pages.
Office Action issued on Jan. 31, 2026 for corresponding Chinese Patent Application No. 202311143754.8., along with an English translation (16 pages).

* cited by examiner

*Primary Examiner* — Huan Le
(74) *Attorney, Agent, or Firm* — Hauptman Ham, LLP

(57) ABSTRACT

A dozer including a cabin, the dozer includes: an engine room located in front of the cabin, where an engine is disposed; an exhaust gas after-treatment device for purifying exhaust gases emitted from the engine; a first cooling device located in front of the cabin and capable of cooling the exhaust gas after-treatment device; and a second cooling device spaced apart from the first cooling device, with the cabin midway therebetween, and capable of cooling the engine.

14 Claims, 13 Drawing Sheets

200:201,202

200:201,202

200:201,202

200:201,202

200:201,202

200:201,202

200:201,202

500

DOZER

CROSS REFERENCE TO RELATED APPLICATION

The present application claims priority to Korean Patent Application No. 10-2022-0114002, filed Sep. 8, 2022, the entire contents of which is incorporated herein for all purposes by this reference.

TECHNICAL FIELD

The present disclosure relates to a dozer, and more particularly, to a dozer that is capable of reducing obstructions to the driver's field of view by effectively placing an engine and an exhaust gas after-treatment device within an engine room.

BACKGROUND

In general, a dozer is a kind of construction equipment that levels ground or pushes soil in an outside working area. Specifically, the dozer is equipped with a blade to the front, which the worker manipulates while closely keeping an eye on the situation in the working area.

If an engine room where an engine is installed is located in front of a cabin, a worker in the cabin will have difficulty in seeing the working area ahead of the dozer because of the installation space of the engine room.

Such obstructions to the worker's field of view will have a great impact on the safety of the worker.

Therefore, it is necessary that the dozer provides the worker's field of view by allowing for compact configuration of the components within the engine room.

SUMMARY

In view of the above, an embodiment of the present disclosure provides a dozer that is capable of reducing obstructions to the driver's field of view and allows effective installation of an engine and an exhaust gas after-treatment device within an engine room.

An exemplary embodiment of the present disclosure provides a dozer including a cabin, the dozer including: an engine room located in front of the cabin, where an engine is disposed; an exhaust gas after-treatment device for purifying exhaust gases emitted from the engine; a first cooling device located in front of the cabin and capable of cooling the exhaust gas after-treatment device; and a second cooling device spaced apart from the first cooling device, with the cabin midway therebetween, and capable of cooling the engine.

Furthermore, the dozer may further include a top cover covering at least one area above the engine room, with a top discharge opening formed therein through which air that has passed through the first cooling device is discharged.

Furthermore, the dozer may further include a front grille portion formed with a front inlet opening for guiding outside air into the first cooling device.

Furthermore, the dozer may further include a lateral body formed with a lateral intake opening for guiding outside air into the second cooling device.

Furthermore, the first cooling device may include a charge-air cooler core.

Furthermore, the second cooling device may include a cooling module for cooling a fluid therein through heat exchange with outside air.

Furthermore, the dozer may further include a fuel tank located under the cabin, for supplying fuel to the engine.

Furthermore, the dozer may further include an oil tank located under the cabin between the fuel tank and the engine, for storing a working fluid required for operation.

Furthermore, the dozer may further include a dividing member that divides the engine room and supports the exhaust gas after-treatment device so as to be located above the engine.

Furthermore, the first cooling device may be located in front of or behind the exhaust gas after-treatment device.

Furthermore, the dozer may further include a main frame formed longitudinally in one direction, for supporting the engine, the fuel tank, and the oil tank.

Furthermore, the first cooling device may be situated farther away from the main frame than the engine.

Furthermore, the top cover may be configured to slope away from the cabin toward a distal end thereof.

Furthermore, the second cooling device may be located behind the cabin.

Another exemplary embodiment of the present disclosure provides a dozer including a cabin, the dozer including: an engine room located in front of the cabin, where an engine is disposed; an exhaust gas after-treatment device located above the engine, for purifying exhaust gases emitted from the engine; a first cooling device located in front of the exhaust gas after-treatment device in such a way as to slope away from the exhaust gas after-treatment device toward a distal end thereof, and capable of cooling the exhaust gas after-treatment device; and a second cooling device located behind the cabin, and capable of cooling the engine.

Advantageous Effects

According to an embodiment of the present disclosure, the dozer allows for compact configuration of the engine room since the second cooling device capable of cooling the engine may be spaced apart from the first cooling device.

Furthermore, the dozer allows for effective installation of the engine and the exhaust gas after-treatment device in the engine room while reducing obstructions to the driver's field of view.

DETAILED DESCRIPTION

Figure 1:
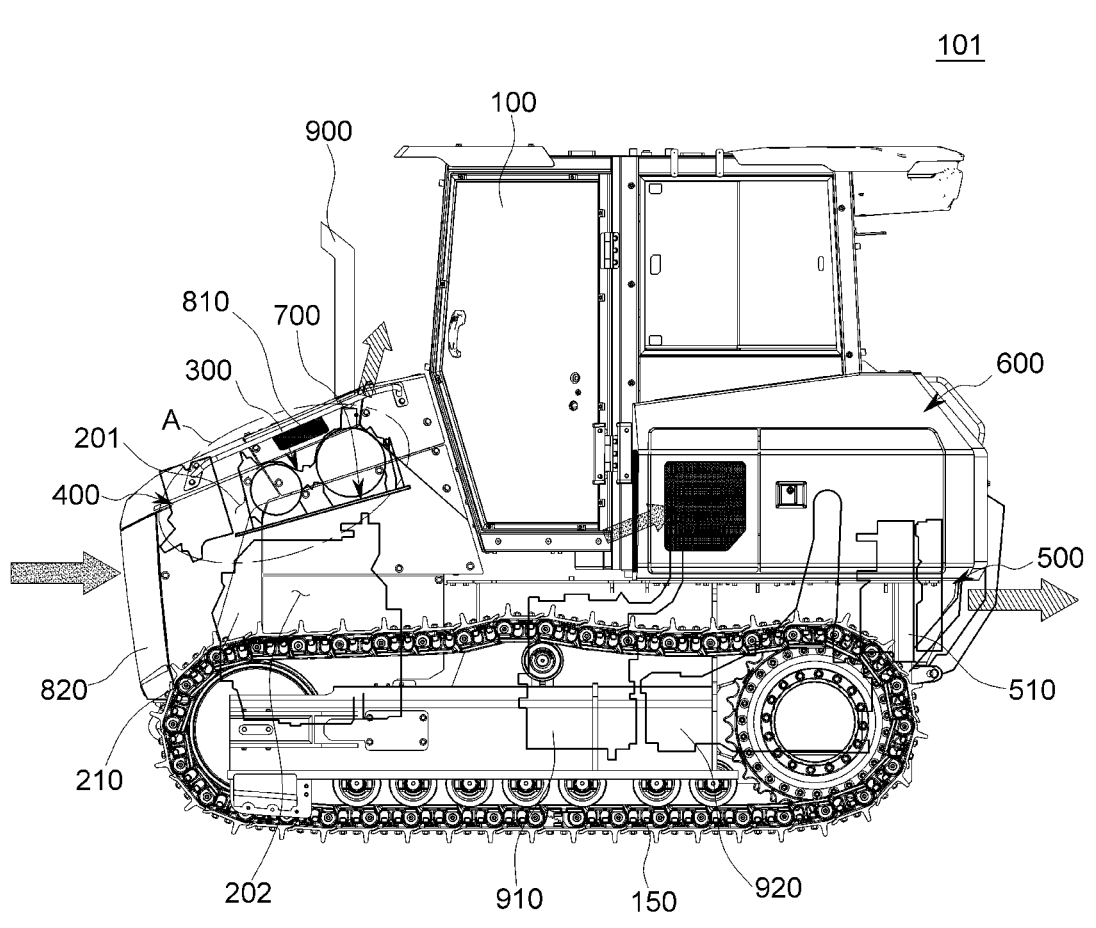
FIG. 1 shows a dozer according to an embodiment of the present disclosure.

Embodiments of the present disclosure will be described in detail below with reference to the accompanying drawings so that those having ordinary knowledge in the art to which the present disclosure pertains can easily practice the present disclosure. The present disclosure may be implemented in various different forms, and is not limited to the embodiments described herein.

It is noted that the drawings are schematic, and are not necessarily drawn to scale. The relative dimensions and ratios of the components in the drawings may be exaggerated or diminished in size for the sake of clarity and convenience, and such arbitrary dimensions are merely illustrative and are not limitative. Furthermore, the same reference symbol is used for the same structure, element, or part shown in two or more drawings in order to represent similar features.

The embodiments of the present disclosure specifically illustrate ideal embodiments of the present disclosure. As a result, various modifications of illustrations are expected. Accordingly, the embodiments are not limited to the specific forms of illustrated regions, and include, for example, the modifications of shapes resulting from manufacture.

Hereinafter, a dozer 101 according to an embodiment of the present disclosure will be described with reference to FIGS. 1 to 12.

The dozer 101 includes a cabin 100 which the driver boards for manipulation.

As illustrated in FIGS. 1 to 7, the dozer 101 according to an embodiment of the present disclosure includes an engine room 200, an exhaust gas after-treatment device 300, a first cooling device 400, and a second cooling device 500.

The engine room 200 is located in front of the cabin 100. Also, the engine 210 is disposed inside the engine room 200. The engine 10 may provide power for operating the cabin 100. Specifically, the engine 210 may provide power to actuate a pump or a motor.

The exhaust gas after-treatment device 300 allows nitrogen oxides contained in exhaust gases emitted from the engine 210 which produce power by combustion of fuels to be reduced and discharged to the outside. That is, the exhaust gas after-treatment device 300 may purify exhaust gases emitted from the engine 210 and let them out of the dozer 101.

The first cooling device 300 may be located in front of the cabin 100 to cool the exhaust gas after-treatment device 300. Specifically, the first cooling device 400 lets outside air into an area where the exhaust gas after-treatment device 300 is installed, thereby cooling the exhaust gas after-treatment device 300.

Alternatively, the first cooling device 400 may be located in front of the exhaust gas after-treatment device 300. Specifically, the first cooling device 400 may be located in front of the exhaust gas after-treatment device 300 in such a way as to slope away from the cabin 100 toward its distal end.

Moreover, the first cooling device 400 is a charge-air cooler (CAC).

Figure 7:
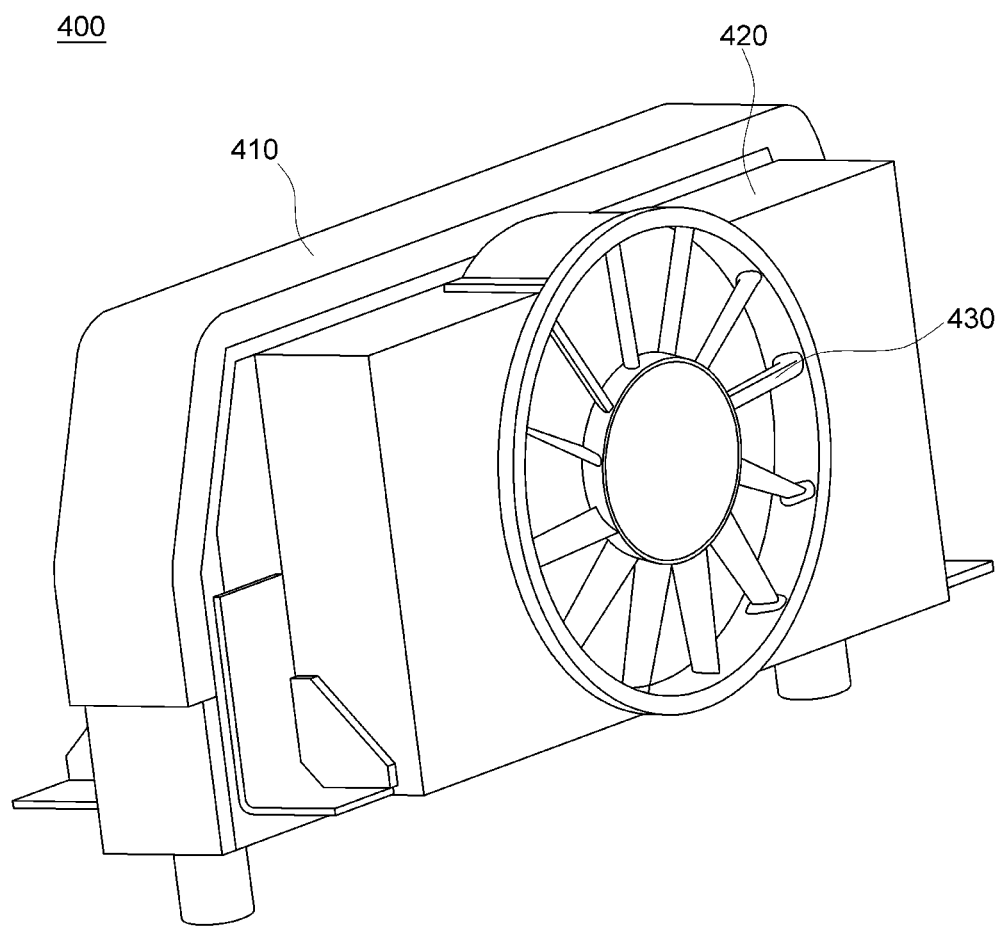
FIG. 7 shows the first cooling device of the dozer according to an embodiment of the present disclosure.

Specifically, the first cooling device 400 includes an electrically driven fan 430, a fan shroud 420, and a CAC core 410, as illustrated in FIG. 7.

The CAC core 410 is disposed at the front, and the fan shroud 420 is installed at the rear of the CAC core 410 to support the electrically driven fan 430. The CAC core 410 is a charge-air cooling core. That is, the CAC forms a flow path for heat exchange, whereby heat exchange takes place. The CAC core 410 may include a fin and a tube. The CAC core 410 may cool supercharged air.

For example, the CAC core 410 may cool supercharged air supplied to the engine 210.

Since the first cooling device 400 includes the electrically driven fan 430, it may effectively cool the exhaust gas after-treatment device 300 by an operation of the electrically driven fan 430 even though it is installed behind the exhaust gas after-treatment device 300.

The second cooling device 500 is spaced apart from the first cooling device 400, with the cabin 100 midway between them. Also, the second cooling device 500 may cool the engine 210.

Specifically, the second cooling device 500 may cool a fluid required for operating or cooling the engine 210. Also, the second cooling device 500 may cool oil and use it to cool the engine 210. That is, the second cooling device 500 may be connected to the engine 210 and pipes (not shown) to cool oil or the like required for cooling the engine 210 and supply it back to the engine 210.

With this configuration, the dozer 101 according to an embodiment of the present disclosure allows a decrease in the volume of the engine room 200 since the second cooling device 500 for cooling the engine 210 is disposed outside the engine room 200. Accordingly, the configuration of the devices installed in the engine room 200 located in front of the cabin 100 and the space occupied by such devices may be reduced, whereby the engine room 200 reduces obstructions to the driver's field of view of the working area when the driver is in the cabin 100.

Moreover, the CAC, which is a type of the first cooling device, may be located near the engine 210, and therefore losses of supercharged air flow pressure produced within a CAC hose may be reduced, thereby enhancing engine efficiency.

In addition, even when the engine 210 of the dozer 101 is stopped, if the after-treatment temperature is high due to a forced regeneration operation or the like of the exhaust gas after-treatment device 300, the exhaust gas after-treatment device 300 may be cooled to effectively prevent its exposure to high temperatures for a long time.

Furthermore, the dozer 101 according to an embodiment of the present disclosure may further include a fuel tank 920, as illustrated in FIG. 1.

The fuel tank 920 may supply the fuel required for combustion of the engine 210. Also, the fuel tank 920 may be disposed between the first cooling device 400 and the second cooling device 500. The fuel tank 920 may be located under the cabin 100.

The fuel tank 920 stores fuel required for combustion to allow the engine 210 to produce power, and may supply the fuel to the engine 210.

Furthermore, the dozer 101 according to an embodiment of the present disclosure may further include an oil tank 910, as illustrated in FIG. 1.

The oil tank 910 may be located under the cabin 100. The oil tank 910 may supply oil to an actuator part which is operated by a hydraulic pressure required to actuate the dozer 101. Specifically, the oil tank 910 may supply a pump with a working fluid required for operation of the dozer 101. That is, the oil tank 910 may store a working fluid to be supplied to a pump.

Furthermore, the dozer 101 according to an embodiment of the present disclosure may further include a dividing member 700, as illustrated in FIGS. 2 to 6.

The dividing member 700 may divide the engine room 200. Also, the dividing member 700 may be located above the engine 210 to divide the engine room 200. Specifically, the dividing member 700 may divide the engine room 200 into an area 202 where the engine 210 is installed and an area 201 where the exhaust gas after-treatment device 300 is installed.

That is, the engine room 200 may include an engine installation area 202 where the engine 210 is installed and an after-treatment device installation area 201 where the exhaust gas after-treatment device 300 is installed. The dividing member 700 may divide the engine installation area 202 and the after-treatment device installation area 201.

Also, the dividing member 700 may support the exhaust gas after-treatment device 300. Specifically, the exhaust gas after-treatment device 300 may be supported on the dividing member 700.

Thus, the dividing member 700 may create an installation area for the exhaust gas after-treatment device 300 and support it. Since the dividing member 700 divides the engine room 200, hot air generated by an operation of the engine 210 is kept from being transferred to the exhaust gas after-treatment device 300 from the area where the engine 210 is installed.

Therefore, the dividing member 700 may create the after-treatment device installation area 201 where the exhaust gas after-treatment device 300 is installed and support it. Since the dividing member 700 divides the engine room 200, hot air generated by an operation of the engine 210 is kept from being transferred to the exhaust gas after-treatment device 300 from the engine installation area 202 where the engine 210 is installed. Also, it is possible to effectively keep high-temperature heat generated in the exhaust gas after-treatment device 300 from being transferred to the engine 210.

Figure 2:
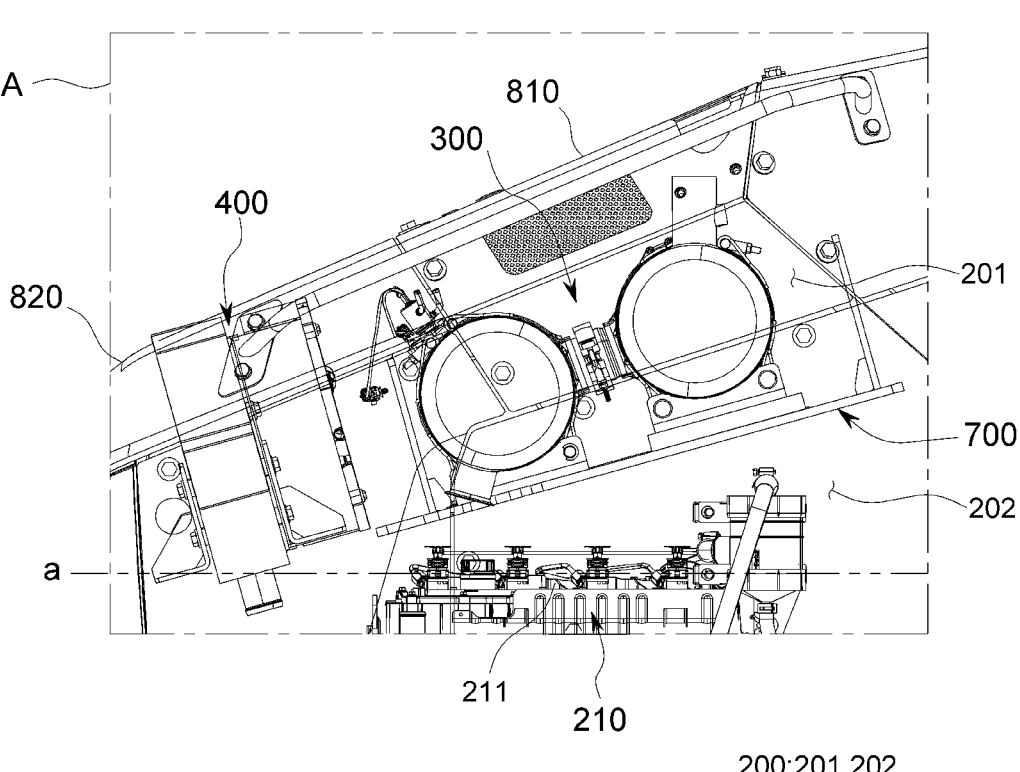
FIG. 2 enlargedly shows part of area A in FIG. 1.
Figure 3:
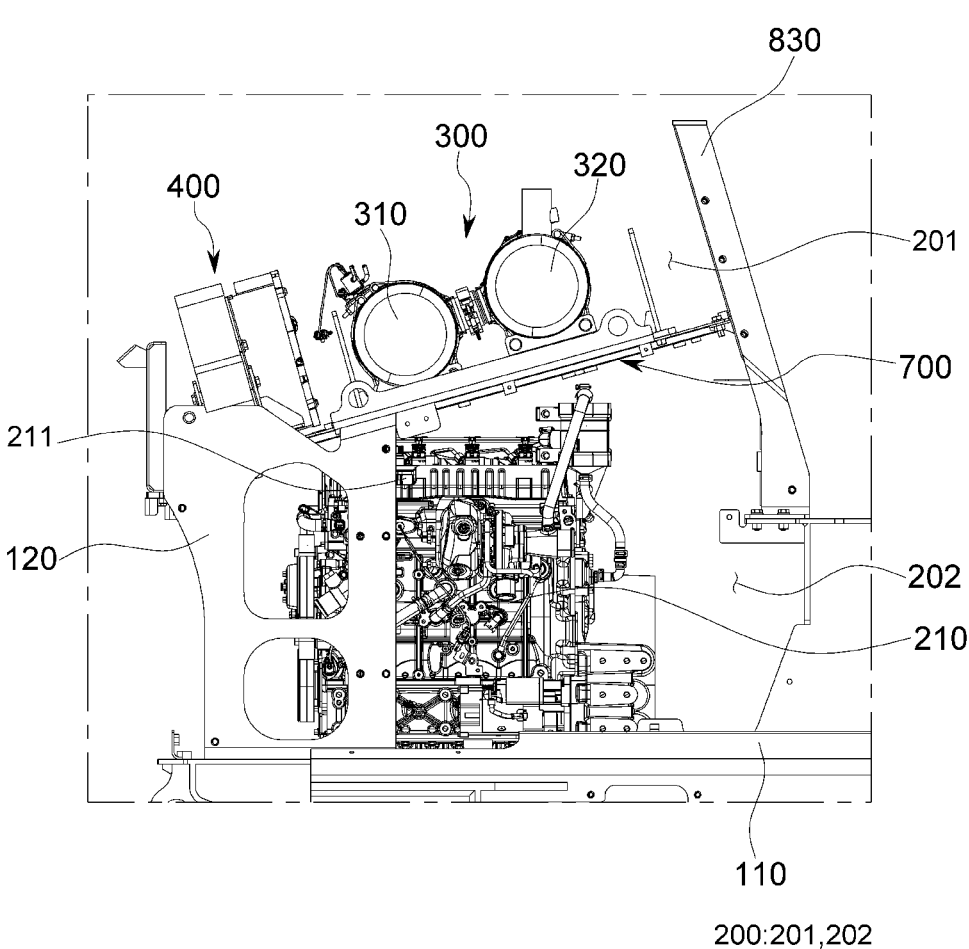
FIG. 3 shows part of the engine room of the dozer according to an embodiment of the present disclosure.
Figure 4:
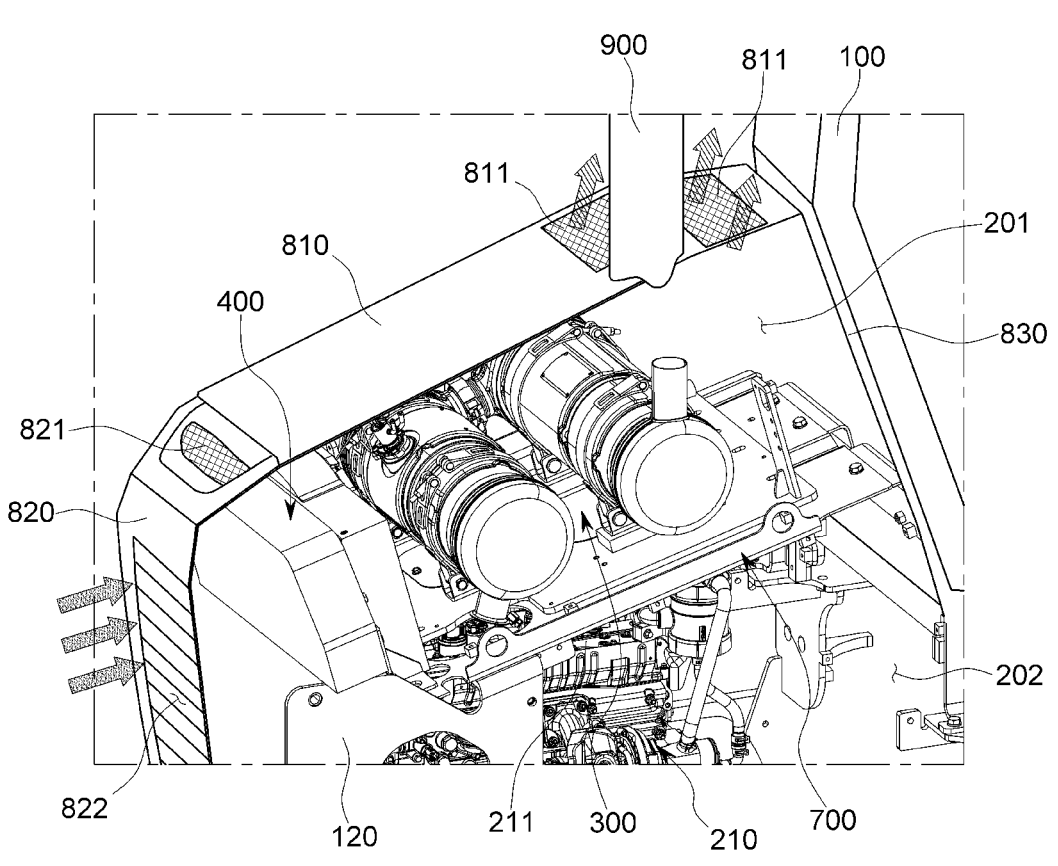
FIG. 4 shows an interior of the engine room of the dozer according to an embodiment of the present disclosure.

Moreover, in the dozer 101 according to an embodiment of the present disclosure, the exhaust gas after-treatment device 300 may be installed in an area spaced apart from the engine 210, as illustrated in FIG. 2.

The exhaust gas after-treatment device 300 may be spaced apart from the engine 210, within the after-treatment device installation area 201 divided by the dividing member 700. Specifically, the exhaust gas after-treatment device 300 may be installed in the after-treatment device installation area 201, and disposed in a space independent of the engine 210.

Also, it is possible to effectively keep high-temperature heat generated in the exhaust gas after-treatment device 300 from being transferred to the engine 210.

In addition, the first cooling device 400 according to an embodiment of the present disclosure may be located in front of the exhaust gas after-treatment device 300, as illustrated in FIGS. 1 to 7.

The first cooling device 400 may be located in front of the exhaust gas after-treatment device 300 so that outside air is admitted into the area where the exhaust gas after-treatment device 300 is installed, thereby cooling the exhaust gas after-treatment device 300.

The first cooling device 400 may cool the exhaust gas after-treatment device 300 by outside air by actuating the exhaust gas after-treatment device 300 and, if the exhaust gas temperature is high, the electrically driven fan 430.

Specifically, a detection member detects the exhaust gas temperature (not shown) and what state the exhaust gas after-treatment device 300 is in. Upon receiving such information from the detection member, a controller may actuate the electrically driven fan 430 to help cool the exhaust gas after-treatment device 300.

Furthermore, the dozer 101 according to an embodiment of the present disclosure may further include a main frame 110, as illustrated in FIGS. 1 to 6.

The main frame 110 may be formed longitudinally in one direction and support the cabin 100. Also, one region of the main frame 110 may support the engine 210. That is, the engine 210 may be installed in front of the main frame 110. Also, the main frame 110 may be supported by a traveling body 150 such that the dozer 101 travels as it makes contact with the ground.

Moreover, the main frame 110 may support the engine 210, the fuel tank 920, and the oil tank 910.

The fuel tank 920 may be disposed between the first cooling device 400 and the second cooling device 500. Specifically, the fuel tank 920 may be installed on the main frame 110 under the cabin 100.

The oil tank 910 may be installed on the main frame 110 between the engine 210 and the fuel tank 920. Also, the oil tank 910 may be located under the cabin 100.

Thus, the main frame 110 may stably support the engine 210, the fuel tank 920, and the oil tank 910.

Figure 6:
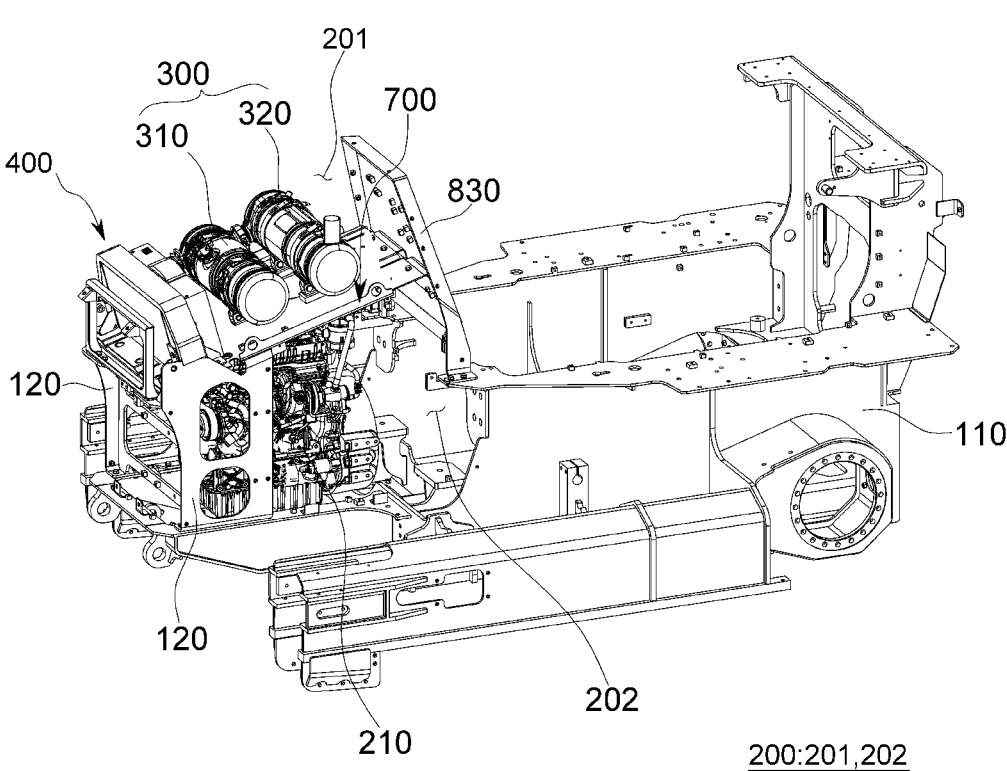
FIG. 6 shows the position of the engine room on the main frame, according to an embodiment of the present disclosure.

Furthermore, the first cooling device 400 of the dozer 101 according to an embodiment of the present disclosure may be situated farther away from the main frame 110 than the engine 210, as illustrated in FIGS. 1 and 6.

The first cooling device 400 may be situated farther away from the main frame 100 than the engine 210, within engine room 200.

Inside the engine room 200, the first cooling device 400 and the exhaust gas after-treatment device 300 may be disposed in an upper part of the engine room 200, and the engine 210 may be disposed in a lower part of the engine room 200.

For example, the first cooling device 400 and the exhaust gas after-treatment device 300 may be disposed together in an upper region of the engine room 200 divided by the dividing member 700.

During operation of the electrically driven fan 430 of the first cooling device 400, outside air is admitted into the upper region of the engine room 200 divided by the dividing member 700, thereby cooling the exhaust gas after-treatment device 300 supported on the dividing member 700.

Moreover, the exhaust gas after-treatment device 300 according to an embodiment of the present disclosure is located in front of the cabin 100, as illustrated in FIG. 1. Also, the exhaust gas after-treatment device 300 is located above the engine 210.

In the dozer 101 according to an embodiment of the present disclosure, the engine 210 and the exhaust gas after-treatment device 300 may be compactly installed in the engine room 200 since the exhaust gas after-treatment device 300 is located above the engine 210.

Furthermore, the dozer 101 according to an embodiment of the present disclosure may further include a top cover 810, as illustrated in FIGS. 1 to 6.

The top cover 810 may cover one area above the engine room 200. Also, the top cover 810 may slope in a direction toward the main frame 110 as it becomes farther away from the cabin 100 toward its distal end.

The top cover 810 sloping in this manner may reduce obstructions to the field of view of the driver who is in the cabin 100.

Moreover, a top discharge opening 811 may be formed in the top cover 810. Specifically, outside air, admitted by an operation of the first cooling device 400 into a top discharge opening 811 formed in one region of the top cover 810, may cool the exhaust gas after-treatment device 300 and then be discharged to the outside. That is, the top cover 810 may cover one upper region of the engine room 200 contiguous to the cabin 100.

For example, a plurality of top discharge openings 811 may be formed on the top cover 810, as illustrated in FIGS. 1 to 8. Also, the top discharge opening 811 may be formed in one region of the top cover 810 that is more contiguous to the cabin 100 than the first cooling device 400.

In addition, the top cover 810 may be divided by the dividing member 700 and cover at least part of the top of the engine room 200 where the exhaust gas after-treatment device 300 is installed. Specifically, the top cover 810 may slope in a direction in which one region thereof situated distal to the cabin 100 becomes closer to one end of the main frame 110, thereby preventing obstructions to the driver's field of view.

Furthermore, the second cooling device 500 according to an embodiment of the present disclosure may be located behind the cabin 100, as illustrated in FIG. 1 and FIGS. 9 to 11.

The second cooling device 500 may be located behind the cabin 100. Also, the second cooling device 500 may be disposed at the rear of the main frame 110.

For example, the second cooling device 500 may be located behind the cabin 100, and, as illustrated in FIG. 1 and FIGS. 9 to 11, may include a cooling module 510 including a radiator and an oil cooler, a rear cooling fan 520, a fan guard 530, a hydraulic fan motor 540, and a rear grille 550.

A fluid passes through the inside of the cooling module 510, and the fluid may be cooled through heat exchange with outside air. After being cooled, the fluid inside the cooling module 510 may be supplied back to the engine 210 to cool the engine 210.

The fan guard 530 may be disposed between the rear cooling fan 520 and the rear grille 550. The fan guard 530 may prevent foreign matters from getting into the rear cooling fan 520 and support the hydraulic fan motor 540. That is, the fan guard 530 may protect the rear cooling fan 520 and support the rear cooling fan 520 to be actuated by the hydraulic fan motor 540.

The rear grille 550 may be disposed in the rearmost part of the dozer 101. The rear grille 550 may prevent foreign matters from the outside from getting into the fan guard 530 or the rear cooling fan 520, and may guide the outside air by which the cooling module 510 has been cooled in such a way that the outside air is let out of the dozer 101.

The cooling module 510 and the rear cooling fan 520 may be installed on the main frame 110. A rear end of the main frame 110 may extend further than a rear end of the traveling body 150 along the length direction of the main frame 110.

Furthermore, the dozer 101 according to an embodiment of the present disclosure may further include a front support frame 120, as illustrated in FIG. 6.

A plurality of front support frames 120 may be disposed in a height direction on the side of the main frame 110 ahead, and may support the first cooling device 400 spaced apart from the main frame 110 in the height direction. That is, a plurality of front support frames 120 may be spaced apart from one another in the width direction of the main frame 110 and support the first cooling device 400. Specifically, the front support frames 120 may support the first cooling device 400 in such a way that the first cooling device 400 is positioned further forward of the main frame 100 than the engine 210 is.

Moreover, the front support frame 120 may support one side of the dividing member 700 as well. Specifically, the other side of the dividing member 700 may be supported by the rear cover 830 disposed at the rear of the engine room 200.

Additionally, the dividing member 700 according to an embodiment of the present disclosure may be configured to slope toward the front.

The dividing member 700 may be configured to slope toward the front. Specifically, one side of the dividing member 700 situated distal to the cabin 100 may slope in a direction toward one end of the main frame 110. That is, the other side of the dividing member 700 supported by the rear cover 830 may be situated in the height direction, farther away from the main frame 110 than one side of the dividing member 700.

Also, the first cooling device 400 may be disposed in an upper part of the engine room 200, along the length direction of the dividing member 700 in which the dividing member 700 slopes.

Thus, the exhaust gas after-treatment device 300 is disposed on the dividing member 700 which is configured to slope toward the front, and therefore, even when the driver is in the cabin 100, the dividing member 700 may effectively support the exhaust gas after-treatment device 300 without obstructing the driver's field of view.

Figure 8:
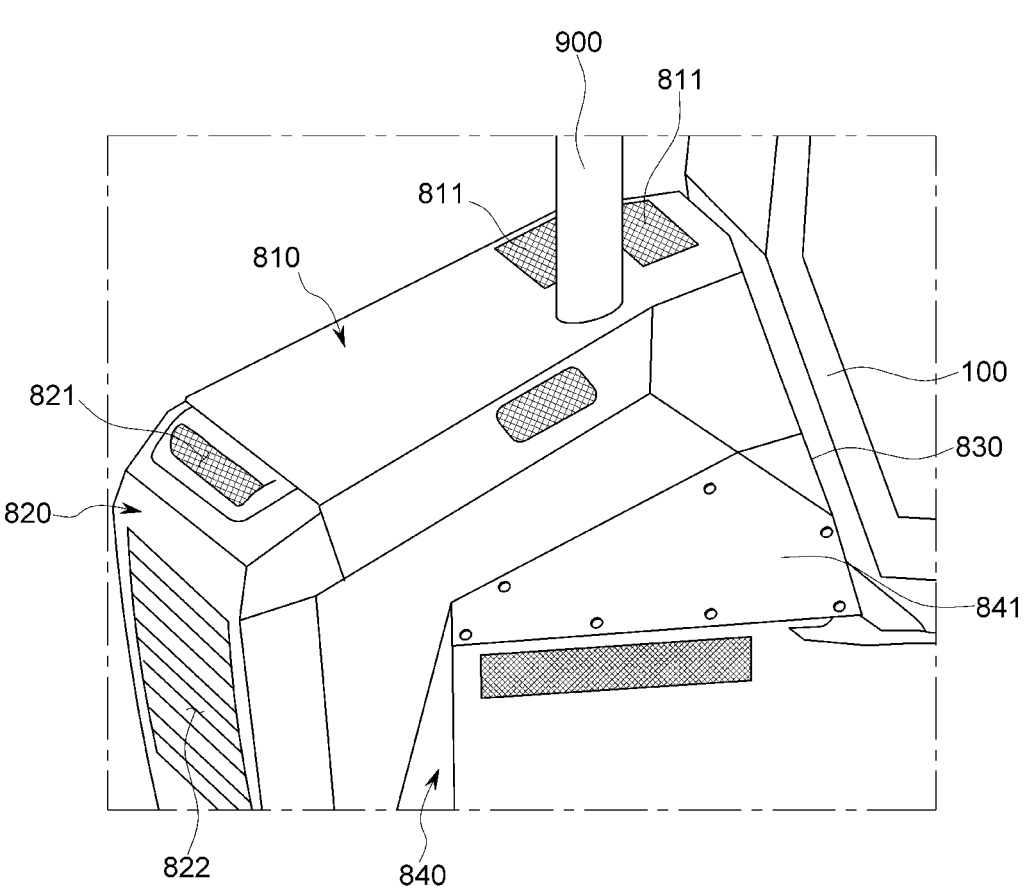
FIG. 8 shows an exterior of the engine room of the dozer according to an embodiment of the present disclosure.
Figure 9:
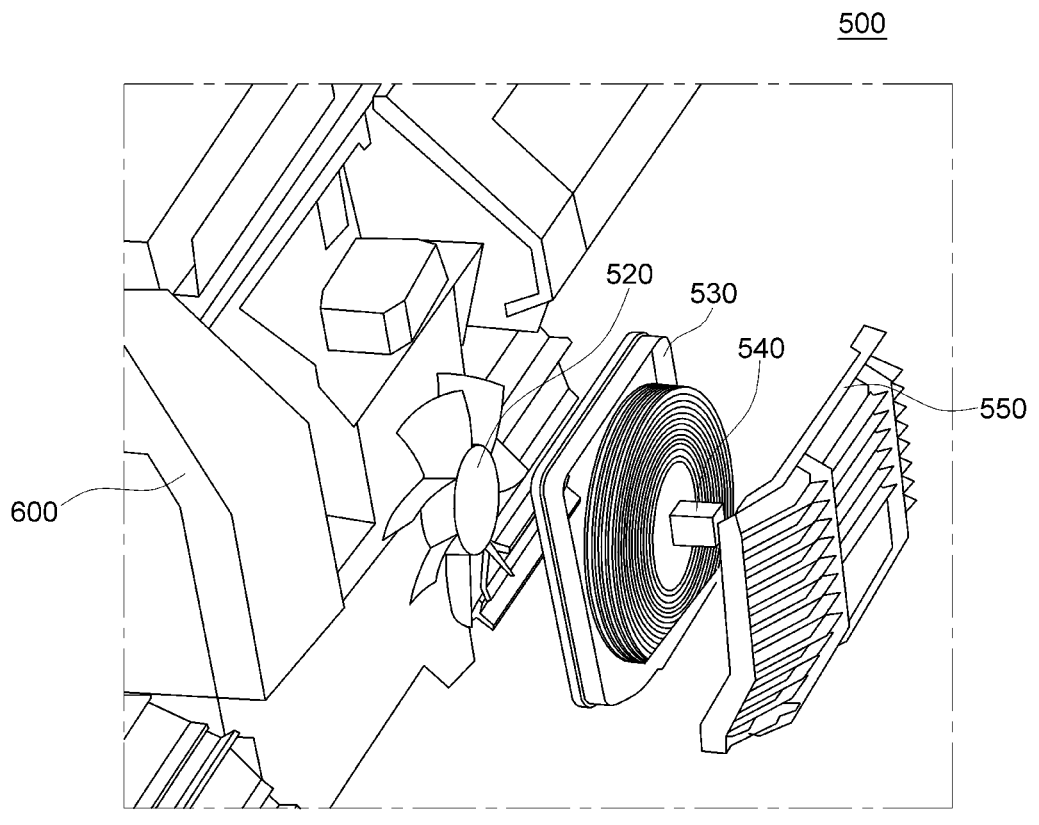
FIG. 9 shows some of assembled parts of the second cooling device according to an embodiment of the present disclosure.

Furthermore, the dozer 101 according to an embodiment of the present disclosure may further include an exhaust pipe 900, as illustrated in FIGS. 1 and 8.

The exhaust pipe 900 may be supported by the top cover 810. Also, the exhaust pipe 900 may guide an exhaust gas that has passed through the exhaust gas after-treatment device 300 so that the exhaust gas is discharged to the outside. The exhaust pipe 900 may be located only on one side in the width direction of the top cover 810.

For example, the top discharge opening 811 may be formed in one region contiguous to the exhaust pipe 900 of the top cover 810.

Furthermore, the dozer 101 according to an embodiment of the present disclosure may further include a side cover 840, as illustrated in FIG. 8.

The side cover 840 may cover the side of the engine room 200. Also, an inspection door 841 that can be opened and closed may be disposed in one region of the side cover 840. Specifically, the side cover 840 may be formed in such a way as to open and close one region of the side of the engine installation area 202.

The check door 841 is disposed on the side cover 840 to improve access when the worker performs maintenance on the engine 210. Specifically, the inspection door 841 may be disposed on the side cover 840 positioned lower than the dividing member 700, so that, when it is opened, the worker has easy access to an injector, etc. of the engine 210 for inspection and maintenance.

Thus, since the inspection door 841 is disposed on the side cover 840, the worker is able to effectively inspect and maintain the engine 210 even if the side cover 840 is not fully opened.

Moreover, the exhaust gas after-treatment device 300 according to an embodiment of the present disclosure may include reactors 310 and 320.

The reactors 310 and 320 may internally accommodate a selective catalytic reduction catalyst. The selective catalytic reduction catalyst may reduce nitrogen oxides contained in exhaust gases that come out of the dozer 101.

For example, the exhaust gas after-treatment device 300 may include a plurality of reactors 310 and 320.

Also, the reactors 310 and 320 may be disposed in a direction intersecting the length direction of the main frame 110. Specifically, the reactors 310 and 320 may be disposed on the dividing member 700 in a direction intersecting the length direction of the dividing member 700.

For example, a diesel oxidation catalyst DOC may be accommodated in the reactor 310 which is more contiguous to the first cooling device 400, among the plurality of reactors 310 and 320. When exhaust gases are admitted, the diesel oxidation catalyst may remove gaseous matter as well as particulate matter by oxidizing harmful emissions contained in the exhaust gases. Specifically, the diesel oxidation catalyst may oxidize carbon monoxide or hydrocarbons to carbon dioxide or water.

Moreover, the reactor 320 may be equipped with a diesel particulate filter (DPF) 321 and a selective catalytic reducer (SCR) 322.

The diesel particulate filter may reduce particulate matter (PM) contained in exhaust gases. Also, the selective catalytic reducer may reduce nitrogen oxides contained in exhaust gases so that the exhaust gases are discharged to the outside with a smaller quantity of nitrogen oxides contained in the exhaust gases.

That is, the exhaust gases emitted from the engine 210 may pass through the diesel oxidation catalyst, the diesel particulate filter, and the selective catalytic reducer and then discharged to the outside with a smaller quantity of nitrogen oxides.

In addition, the foremost end of the exhaust gas after-treatment device 300 according to an embodiment of the present disclosure may be positioned further rearward than the foremost end of the engine 210, as illustrated in FIGS. 1 to 6.

As used herein, the term "foremost end" may refer to a foremost end oriented in the length direction of the main frame 110.

Since the foremost end of the exhaust gas after-treatment device 300 may be disposed more contiguous to the cabin 100 than the foremost end of the engine 210 is, the first cooling device 400 may be effectively installed in front of the exhaust gas after-treatment device 300.

In addition, the foremost end of the first cooling device 400 may be positioned further forward than the foremost end of the engine 210. Specifically, the CAC core 410 may be positioned further forward than the foremost end of the engine 210.

Figure 10:
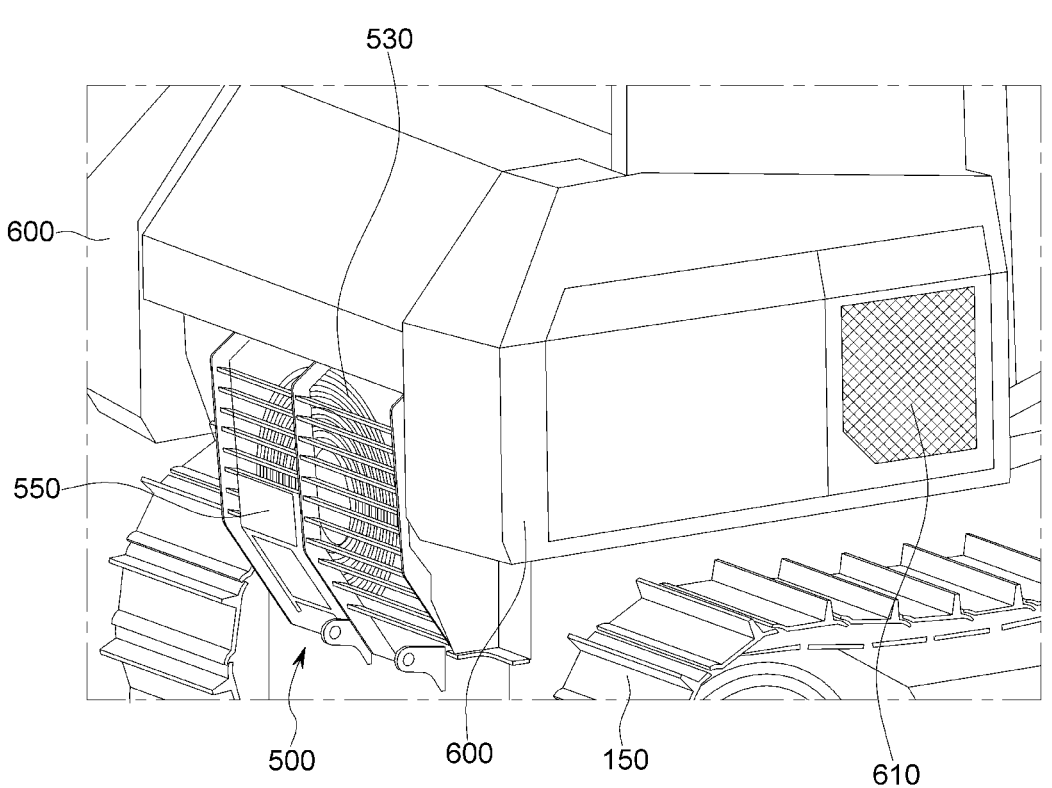
FIG. 10 shows one side of the lateral body of the dozer according to an embodiment of the present disclosure.
Figure 11:
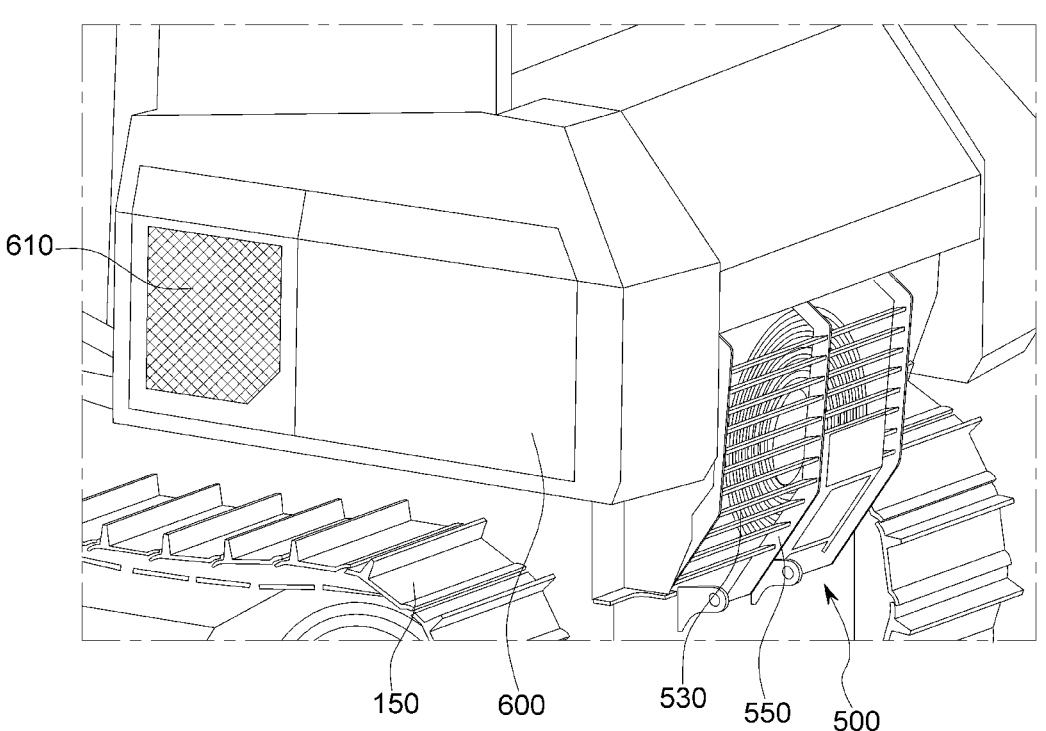
FIG. 11 shows the other side of the lateral body of the dozer according to an embodiment of the present disclosure.

Furthermore, the dozer 101 according to an embodiment of the present disclosure may further include a lateral body 600, as illustrated in FIG. 1 and FIGS. 10 and 11.

The lateral body 600 may be installed on the main frame 110, and extend and protrude to both sides of the cabin 100. Also, devices required for the dozer 101 may be installed inside the lateral body 600. Specifically, the lateral body 600 may be disposed on the side and at the rear of the cabin 100 and form a space inside where devices required for operation of the dozer 101 can be installed.

Lateral intake openings 610 may be formed on both sides of the lateral body 600. Outside air admitted into the lateral intake opening 610 may pass through the second cooling device 500, be cooled, and then exit through the rear grille 550.

By the operation of the rear cooling fan 520, outside air coming from the lateral intake openings 610 on both sides may pass through the cooling module 510, exchange heat with a fluid inside it passing through the cooling module 510, and then be discharged to the outside through the rear grille 550.

For example, in a side view of the dozer 101, as illustrated in FIG. 1 and FIGS. and 11, one outer region of the rear grille 550 may protrude than the lateral body 600. Specifically, one outer region of the rear grille 550 may be positioned further rearward than the lateral body 600.

Furthermore, the dozer 101 according to an embodiment of the present disclosure may further include a front grille portion 820.

One region of the front grille portion 820 may be located in front of the engine room 200, and the front grille portion 820 may guide outside air to enter the engine room 200. Specifically, outside air may be guided through the front grille portion 820 to flow above or below the dividing member 700.

Moreover, the rest of the front grille portion 820 may be located above the engine room 200. Specifically, the rest of the front grille portion 820 may cover the area above the engine room 200 that is not covered by the top cover 810.

Additionally, the rest of the front grille portion 820 may cover an area above the first cooling device 400. Also, front inlet openings 821 and 822 for guiding outside air to flow above the dividing member 700 and toward the first cooling device 400 may be formed in the rest of the front grille portion 820.

Figure 12:
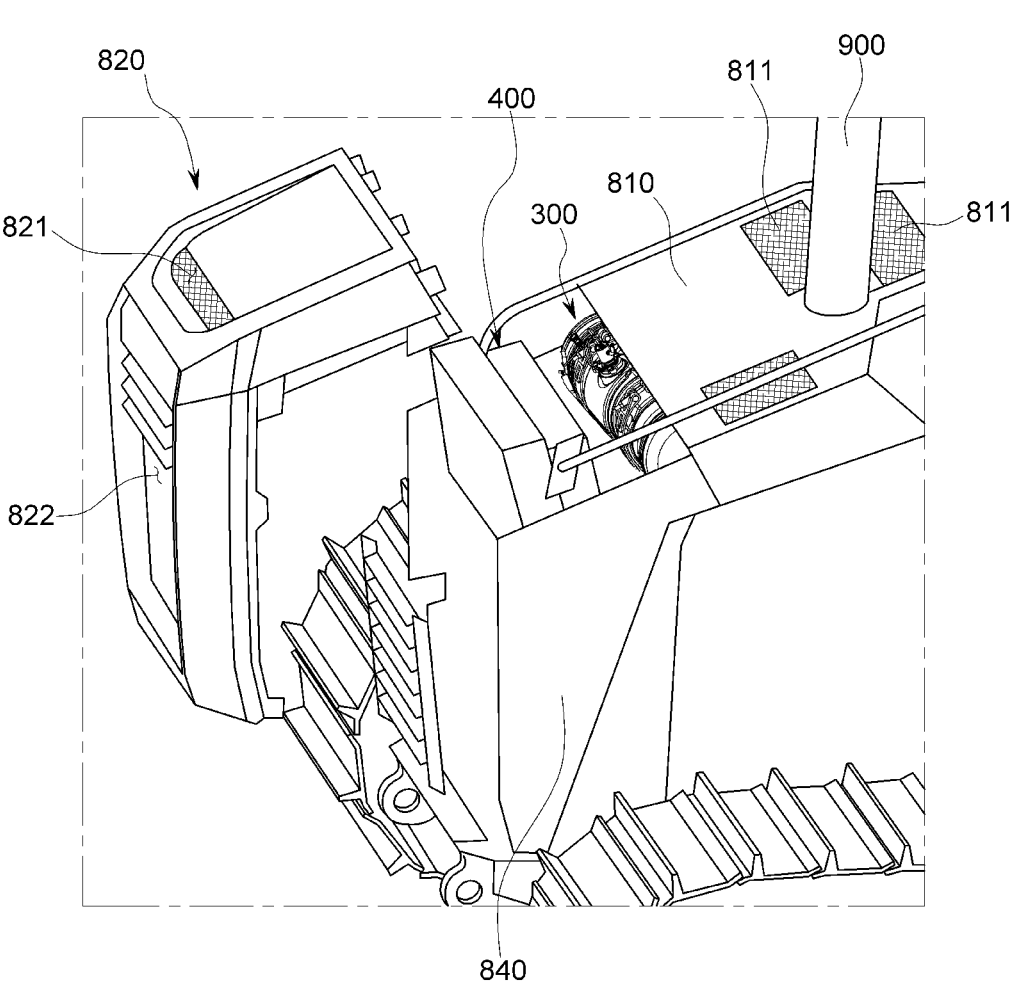
FIG. 12 shows the front grille portion of the dozer according to an embodiment of the present disclosure.

For example, as illustrated in FIG. 12, the front grille portion 820 may be formed to cover the engine room 200, including the front of the engine room 200 and even part of the area above the engine room 200. That is, the front grille portion 820 may be formed roughly in a rotated L-shape.

Specifically, the front inlet openings 821 and 822 may include a first inlet opening 822 which is a portion of the front grille portion 820 contiguous to the engine 210 where a grille is disposed, and a second inlet opening 821 which is a portion of the front grille portion 820 more contiguous to the first cooling device 400 than to the engine 210.

Figure 13:
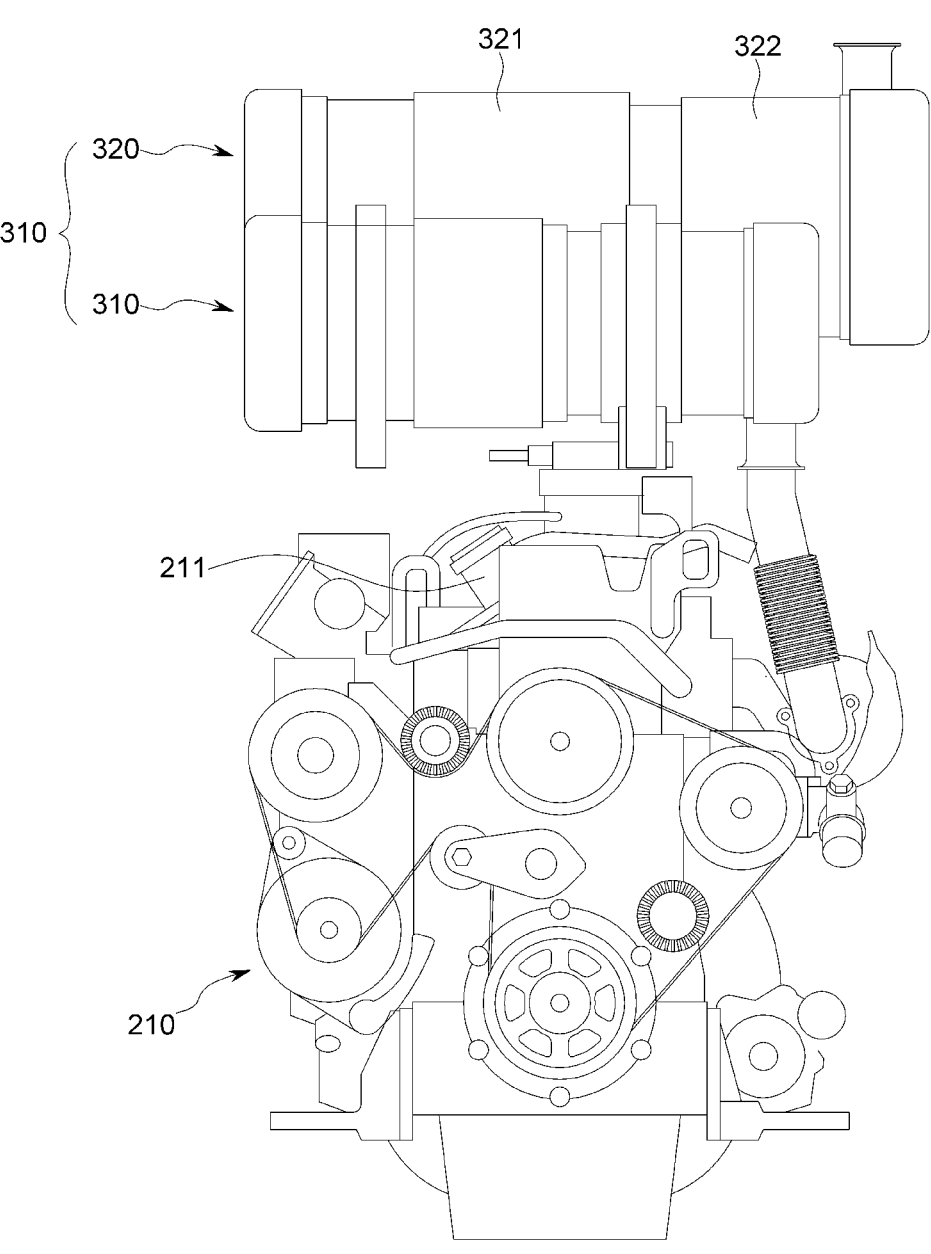
FIG. 13 shows part of the engine room of the dozer according to an embodiment of the present disclosure, as viewed from the front.

Furthermore, as illustrated in FIG. 13, the dozer 101 according to an embodiment of the present disclosure may be configured in such a way that the exhaust gas after-treatment device 300 and the engine 210 do not overlap each other, when viewed from the front of the dozer 101. Specifically, when viewed from the front of the dozer 101 in a direction parallel to the length direction of the main frame 110, the exhaust gas after-treatment device 300 may be configured in such a way as to not overlap the engine 210.

When viewed from the front of the dozer 101, the exhaust gas after-treatment device 300 and the engine 210 may be configured in such a way as to be spaced apart from each other and not overlap each other. Specifically, the exhaust gas after-treatment device 300 may be located above the engine 210 such that the engine 210 and the exhaust gas after-treatment device 300 do not overlap each other. When viewed from the front of the dozer 101, the reactors 310 and 320 may be spaced apart from the engine 210 inside which a combustion chamber is formed.

That is, when the dozer 101 is viewed from the front, while the front grille portion 820, the first cooling device 400, and the dividing member 700 are omitted, the exhaust gas after-treatment device 300 may be configured in such a way to not overlap the engine 210, as illustrated in FIG. 13.

Thus, the exhaust gas after-treatment device 300 and the engine 210, within the engine room 200, may be installed independently of each other in areas spaced apart by the dividing member 700.

Accordingly, the exhaust gas after-treatment device 300 and the engine 210 may be cooled independently of each other. That is, the dozer 101 according to an embodiment of the present disclosure may effectively prevent heat from the exhaust gas after-treatment device 300 from affecting the engine 210 and prevent heat generated from the engine 210 from being transferred to the exhaust gas after-treatment device 300.

Moreover, the exhaust gas after-treatment device 300 and the engine 210 may be configured in such a way as to not overlap each other even when viewed from the side of the engine room 200 of the dozer 101, as illustrated in FIG. 2.

As illustrated in FIG. 2, the exhaust gas after-treatment device 300 may be positioned higher than the engine 210. Also, as illustrated in FIG. 2, the exhaust gas after-treatment device 300 may be positioned higher than the engine 210. Specifically, the exhaust gas after-treatment device 300 may be configured in such a way as to not overlap one end of a cylinder head cover 211 supported by the top of the engine 210 which internally has a combustion chamber to produce power, even when viewed from the side of the engine room 200. That is, the reactor 310 of the exhaust gas after-treatment device 300 may be positioned higher than an imaginary line (a) which extends in a direction parallel to the main frame 110 from the cylinder head cover 311 of the engine 210 installed above the engine 210. Specifically, the engine 211 may include a cylinder block internally having a combustion chamber, a cylinder head, and the cylinder head cover 211.

That is, the exhaust gas after-treatment device 300 may be spaced apart from the engine 210 so as not to overlap the engine 210, when viewed from the front of the dozer 101 in a direction parallel to an upper surface of the cylinder head cover 211 of the engine 210.

Figure 5:
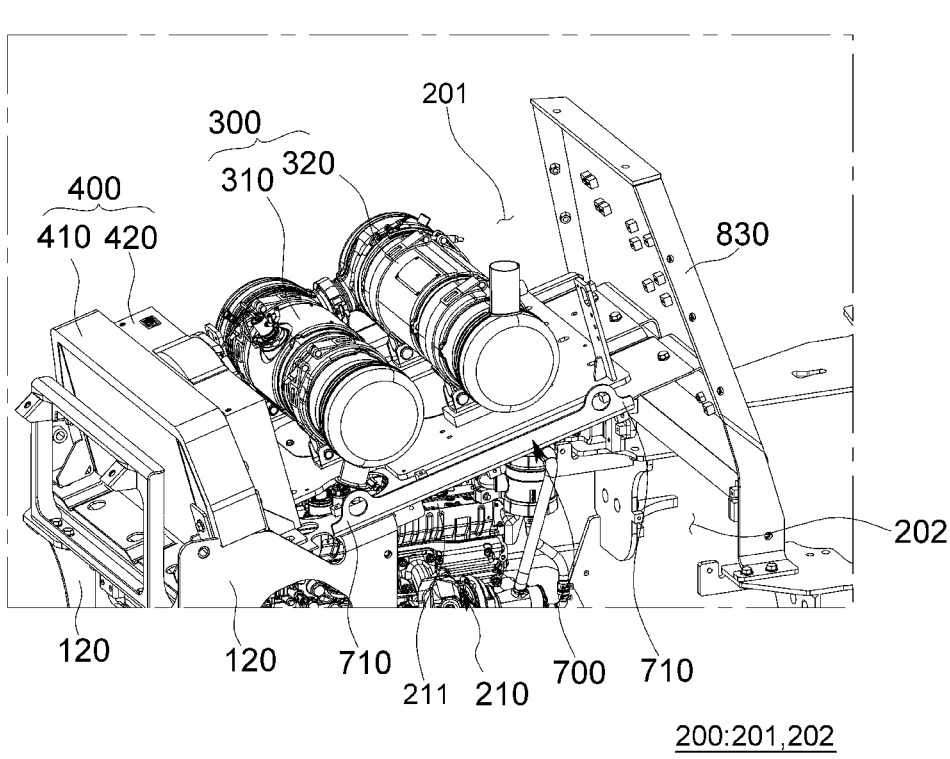
FIG. 5 shows a configuration of the engine room of the dozer according to an embodiment of the present disclosure.

Moreover, the dividing member 700 according to an embodiment of the present disclosure may include a pull ring 710, as illustrated in FIG. 5.

The pull ring 710 may be formed on the dividing member 700 in such a way as to protrude toward the top cover 810. Also, the pull ring 710 may have a through-hole to facilitate the installation of a rope or wire for pulling the dividing member 700.

In addition, a plurality of pull rings 710 may be formed on the dividing member 700 so that the dividing member 700 is stably removed from the engine room 200. Since the dividing member 700 supports the exhaust gas after-treatment device 300, the maintenance and replacement of the exhaust gas after-treatment device 300 may be done easily through the removal of the dividing member 700.

Specifically, because the dividing member 700 is fastened with removable bolts and nuts to the rear cover 830 and the front support frame 120 within the engine room 200, its supporting structure may be disassembled from the rear cover 830 and the front support frame 120 when it is necessary to remove the dividing member 700.

For example, the plurality of pull rings 710 may be spaced apart from each other along the length direction of the dividing member 700 and the width direction of the dividing member 700.

With this configuration, the dozer 101 according to an embodiment of the present disclosure allows effective installation of the first cooling device 400 and the second cooling device 500, as illustrated in FIG. 1.

Furthermore, the dozer 101 according to an embodiment of the present disclosure allows for compact and effective installation of the engine 210 and the exhaust gas after-treatment device 300 in the engine room 200.

Although embodiments of the present disclosure have been described with reference to the accompanying drawings, those of ordinary skill in the art to which the present disclosure belongs can understand that the present disclosure may be implemented in other specific forms without changing the technical spirit or essential features.

Therefore, the embodiments described hereinabove are to be understood as illustrative and not restrictive in all respects, the scope of the present disclosure described in the above detailed description is indicated by the following claims, and all changes or modifications derived from the meaning and scope of the claims and their equivalents should be construed as being included in the scope of the present disclosure.

What is claimed is:

1. A dozer including a cabin, the dozer comprising:
   an engine room located in front of the cabin, where an engine is disposed;
   an exhaust gas after-treatment device for purifying exhaust gases emitted from the engine;
   a first cooling device located in front of the cabin and capable of cooling the exhaust gas after-treatment device; and
   a second cooling device is disposed behind the cabin and capable of cooling the engine,
   wherein
   the exhaust gas after-treatment device is disposed above the engine in the engine room and disposed between the cabin and the first cooling device, and is configured to be cooled by the first cooling device, and
   the first cooling device is located in the engine room.

2. The dozer of claim 1, further comprising a top cover covering at least one area above the engine room, with a top discharge opening formed therein through which air that has passed through the first cooling device is discharged.

3. The dozer of claim 2, wherein the top cover is configured to slope away from the cabin toward a distal end thereof.

4. The dozer of claim 1, further comprising a front grille portion formed with a front inlet opening for guiding outside air into the first cooling device.

5. The dozer of claim 1, further comprising a lateral body formed with a lateral intake opening for guiding outside air into the second cooling device.

6. The dozer of claim 1, wherein the first cooling device includes a charge-air cooler core.

7. The dozer of claim 1, wherein the second cooling device includes a cooling module for cooling a fluid therein through heat exchange with outside air.

8. The dozer of claim 1, further comprising a fuel tank located under the cabin, for supplying fuel to the engine.

9. The dozer of claim 8, further comprising an oil tank located under the cabin between the fuel tank and the engine, for storing a working fluid required for operation.

10. The dozer of claim 9, further comprising a main frame formed longitudinally in one direction, for supporting the engine, the fuel tank, and the oil tank.

11. The dozer of claim 10, wherein the first cooling device is situated farther away from the main frame than the engine.

12. The dozer of claim 1, further comprising a dividing member that divides the engine room and supports the exhaust gas after-treatment device so as to be located above the engine.

13. The dozer of claim 1, wherein the first cooling device is located in front of the exhaust gas after-treatment device and is inclined downward relative to the exhaust gas after-treatment device as the first cooling device extends toward a side relatively distant from the cabin.

14. A dozer including a cabin, the dozer comprising:

an engine room located in front of the cabin, where an engine is disposed;

an exhaust gas after-treatment device located above the engine, for purifying exhaust gases emitted from the engine;

a first cooling device located in front of the exhaust gas after-treatment device in such a way as to slope away from the exhaust gas after-treatment device toward a distal end thereof, and capable of cooling the exhaust gas after-treatment device; and a second cooling device located behind the cabin and capable of cooling the engine.

* * * * *